(12) United States Patent
Stover

(10) Patent No.: US 7,757,353 B2
(45) Date of Patent: Jul. 20, 2010

(54) DIGESTING CYLINDRICAL MODULES

(75) Inventor: Jimmy R. Stover, Corpus Christi, TX (US)

(73) Assignee: Stover Equipment Co., Inc., Corpus Christi, TX (US)

( * ) Notice: Subject to any disclaimer, the term of this patent is extended or adjusted under 35 U.S.C. 154(b) by 353 days.

(21) Appl. No.: 11/904,208

(22) Filed: Sep. 26, 2007

(65) Prior Publication Data

US 2008/0052876 A1 Mar. 6, 2008

Related U.S. Application Data

(63) Continuation-in-part of application No. 11/350,314, filed on Feb. 3, 2006.

(60) Provisional application No. 60/847,158, filed on Sep. 26, 2006.

(51) Int. Cl.
*D01B 1/04* (2006.01)
(52) U.S. Cl. ........................ 19/64.5; 19/65 A
(58) Field of Classification Search .................. 19/48 R, 19/64.5, 65 A; 414/412, 810
See application file for complete search history.

(56) References Cited

U.S. PATENT DOCUMENTS

| 2,989,252 | A | | 6/1961 | Babb |
|---|---|---|---|---|
| 3,757,973 | A | * | 9/1973 | Lambert et al. ............. 414/810 |
| 3,991,944 | A | | 11/1976 | Balikoff |
| 4,057,876 | A | | 11/1977 | Sawyer |
| 4,592,698 | A | | 6/1986 | Semp |
| 4,610,596 | A | | 9/1986 | Bouldin |
| 4,766,648 | A | | 8/1988 | Kerley |
| 4,929,141 | A | | 5/1990 | Keesey |
| 5,179,878 | A | | 1/1993 | Kranefeld |
| 5,228,628 | A | | 7/1993 | Temburg |
| 5,318,399 | A | | 6/1994 | Marom |
| 5,340,040 | A | | 8/1994 | Bussiere |
| 5,371,938 | A | | 12/1994 | Martin |
| 5,454,683 | A | | 10/1995 | Marom |
| 5,771,661 | A | | 6/1998 | Martin |
| 6,202,950 | B1 | | 3/2001 | Hruska |
| 6,332,426 | B1 | | 12/2001 | Van Den Berg |
| 6,481,653 | B2 | | 11/2002 | Hruska |
| 6,648,254 | B2 | | 11/2003 | Hruska |
| 6,786,438 | B2 | * | 9/2004 | Winn ........................ 241/65 |
| 7,165,928 | B2 | | 1/2007 | Haverdink |
| 2004/0055438 | A1 | | 3/2004 | Ours et al. |
| 2005/0207877 | A1 | | 9/2005 | Haverdink et al. |
| 2006/0191241 | A1 | | 8/2006 | Deutsch |

* cited by examiner

*Primary Examiner*—Shaun R Hurley
(74) *Attorney, Agent, or Firm*—G Turner Moller

(57) ABSTRACT

A conveyor delivers a series of cylindrical wrapped fibrous modules to a station where the module is lifted off the conveyor and an operation conducted on the module. One operation is to find a tail, or unattached segment, of the cover. Another operation is to remove the cover, by slitting and then unwinding it. The cover is delivered to a storage area and the contents of the module are delivered into a hopper, or in some embodiments, into a disperser. In some embodiments, a grabber moves the slit cover from adjacent a slitting position to a storage area and includes a guide wheel for moving a conveyor up and down in response to the configuration of the round module. In one embodiments, the plastic cover is removed manually by workers guiding the plastic wrap as it is unrolled by the unrolling device.

12 Claims, 11 Drawing Sheets

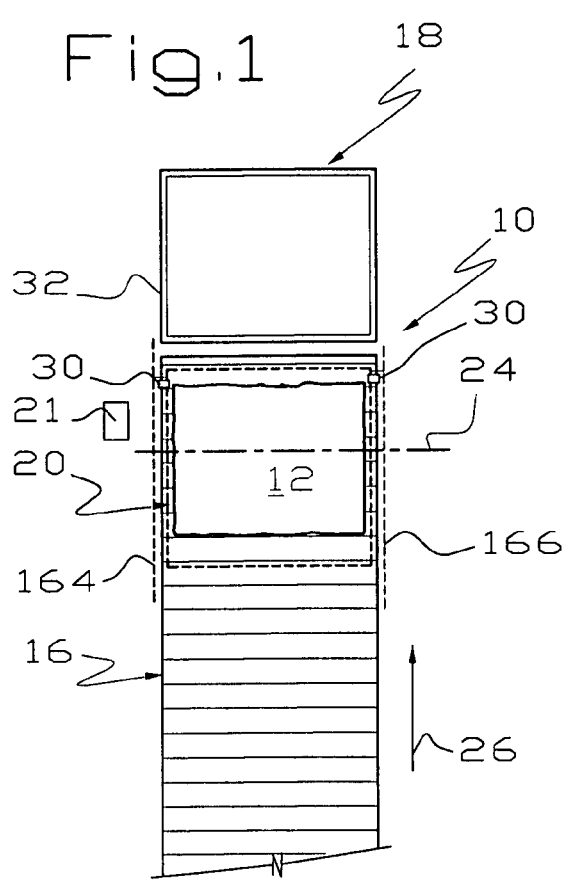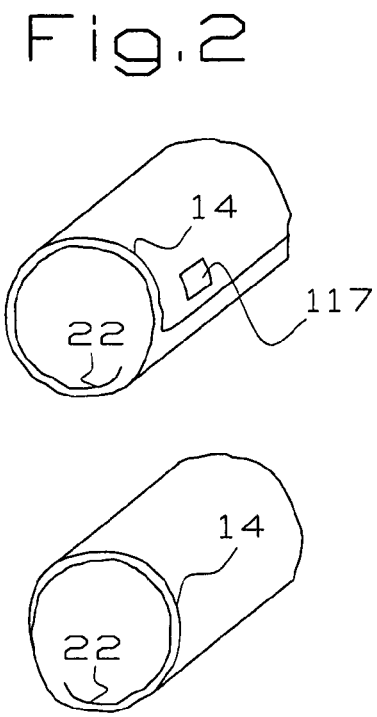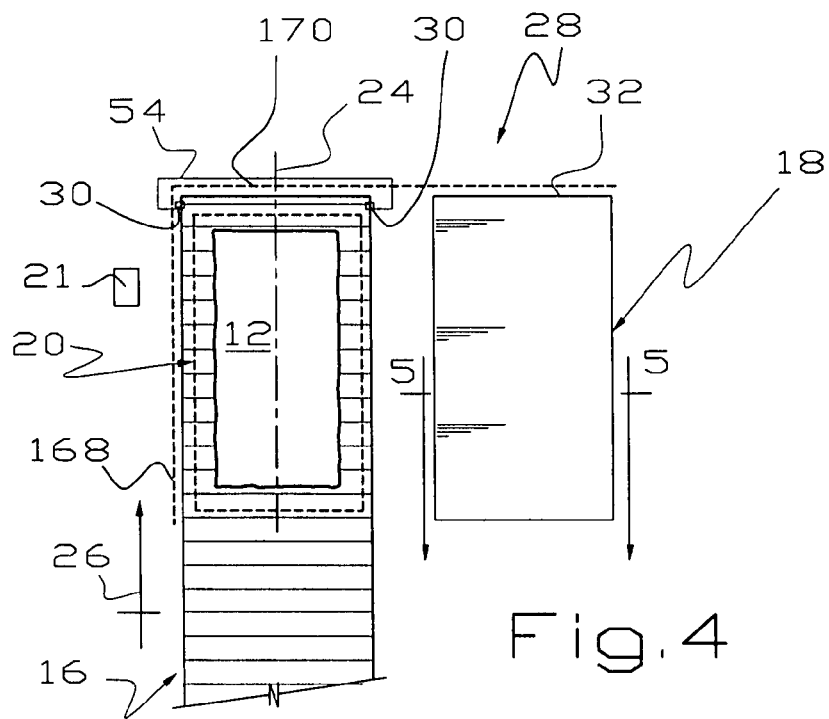

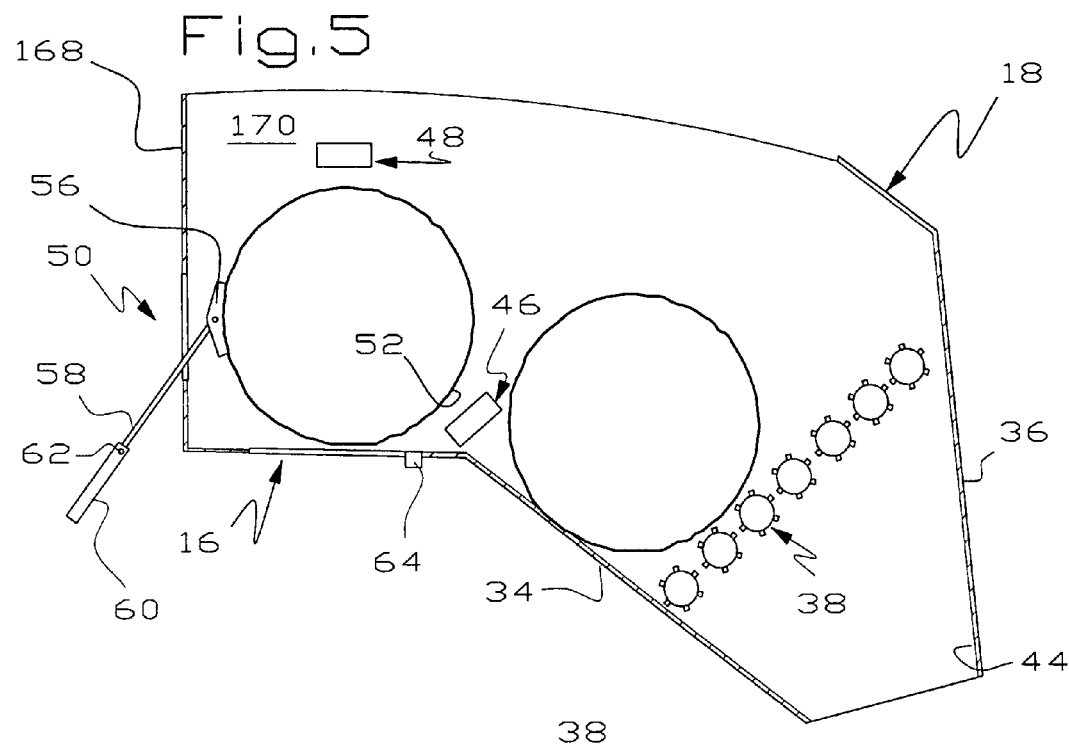
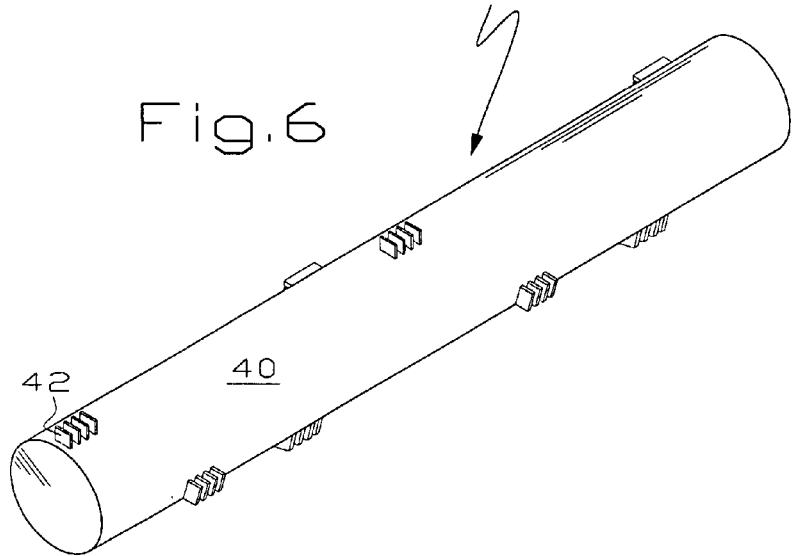

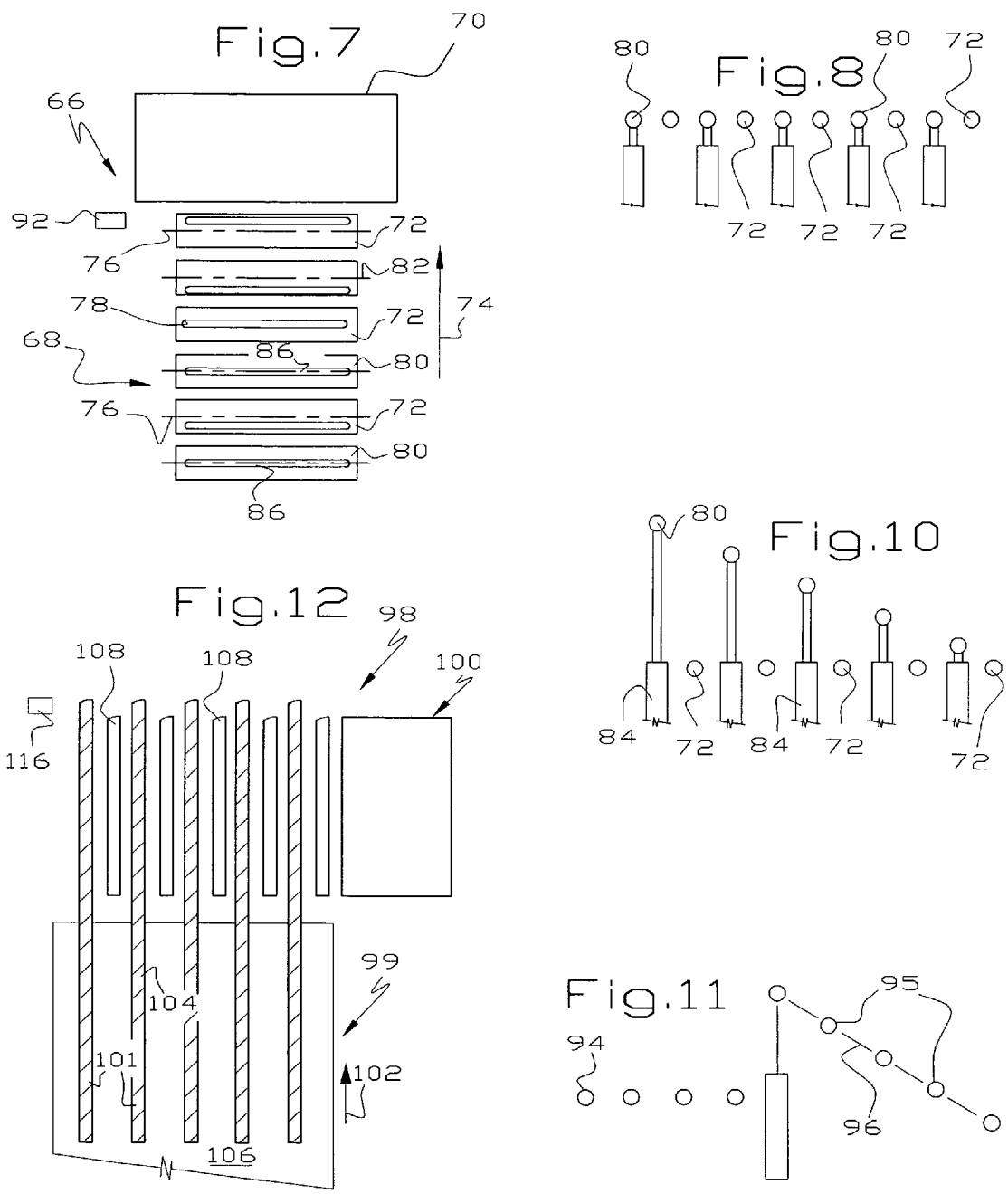

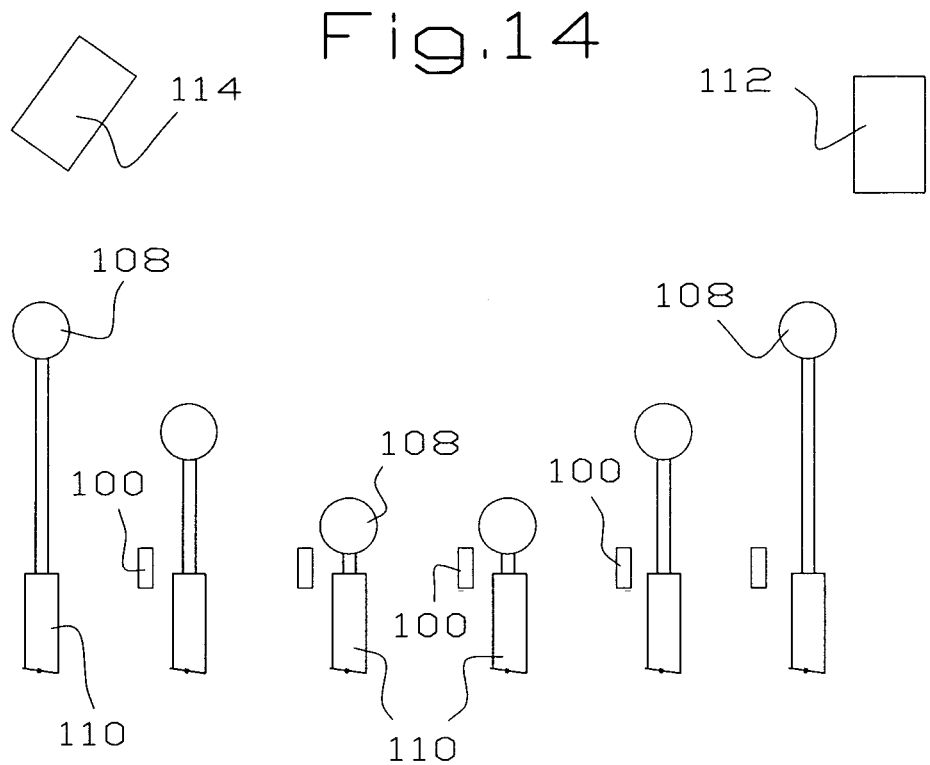
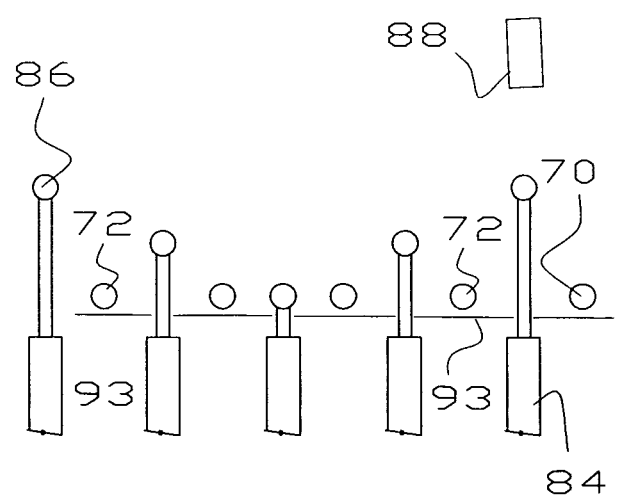

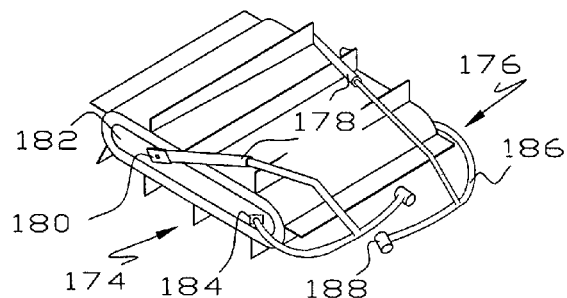
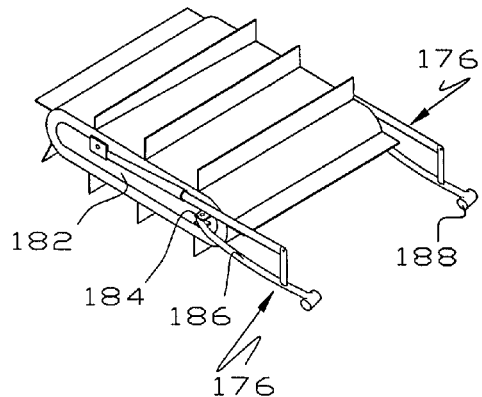
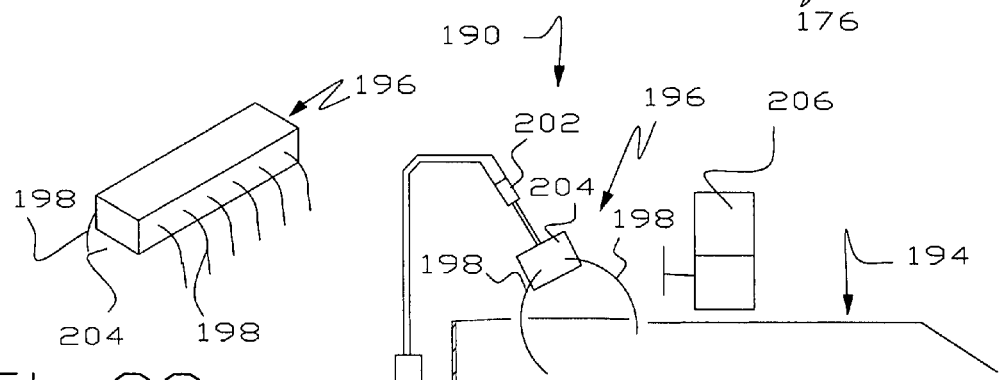
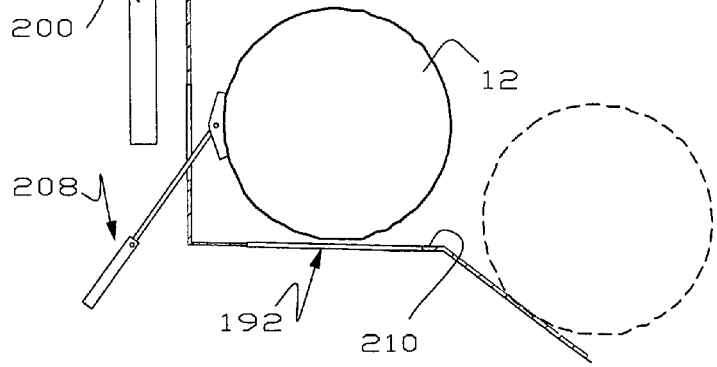

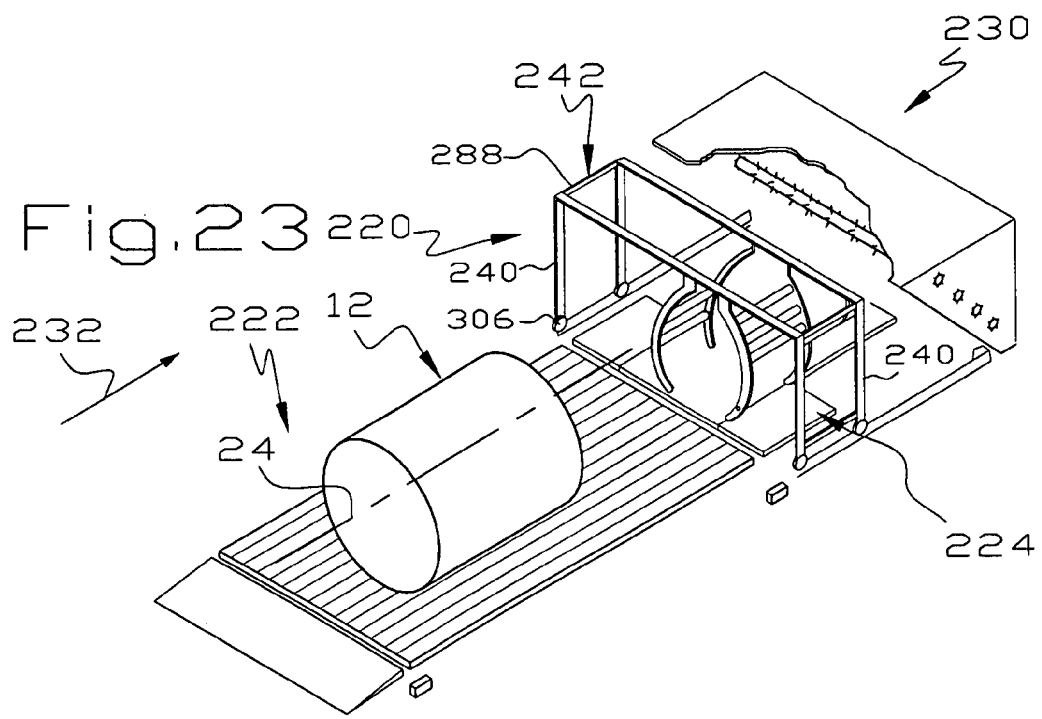
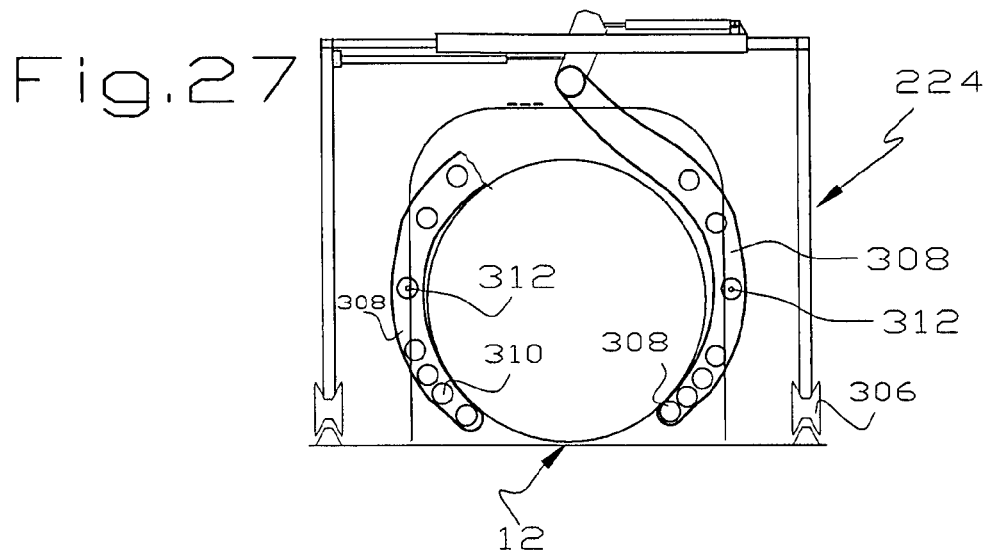

DIGESTING CYLINDRICAL MODULES

This application is based on provisional application Ser. No. 60/847,158 filed Sep. 26, 2006 and is a continuation-in-part of application Ser. No. 11/350,314, filed Feb. 3, 2006.

This invention relates to a method and apparatus for removing a wrapping or cover from cylindrical modules of fibrous materials.

BACKGROUND OF THE INVENTION

Although this invention has potential application for handling other cylindrical bales of fibrous materials, it will mainly be described in conjunction with its most imminent and important application, which is the handling of cylindrical seed cotton modules.

Handling of seed cotton from the time it is picked, or stripped, in the field until it enters a cotton gin has evolved over the years. Fifty years ago, seed cotton was dumped into small trailers and hauled to the gin. This was supplanted by cotton module technology where cotton from a picker/stripper is delivered to a module builder on the edge of the field. A large rectangular cotton module is made by alternately dumping seed cotton into the builder and then packing the cotton. The module is discharged from the module builder onto the ground and the top is covered with a plastic tarpaulin or cover. Later, the module is picked up by a special module retriever truck and hauled to the gin where it is stored, almost always outside, along with a large number of other modules until the gin is ready to handle this particular module. The module is then picked up by the same or similar module truck and hauled to a module feeder. The plastic cover is removed and the module conveyed to a disperser where the module is disintegrated and the cotton fibers are delivered to the gin. Cotton module technology, expensive as it is, is considerably more efficient, all things considered, than hauling loose cotton in cotton trailers. Accordingly, cotton module technology completely replaced cotton trailers and has been the standard of the industry for several decades.

Current cotton module technology has its problems. A major problem is caused by the fact that module builders discharge the packed cotton module onto the ground. Even though the cotton is fairly tightly packed and attempts are made to position the cotton modules on fairly high ground, there is always the potential for water to collect around the base of the module and wick up into the module, damaging a bottom layer of the cotton to an extent where it cannot be ginned. Six inches or a foot of damaged cotton on the bottom of a module will be seen to be a significant part of a module ten feet high. In addition, the plastic covers on top of the module, which are intended to shed water, are not perfect. The worst thing that can happen is for the cover to have, or develop, a hole where rain enters and damages the seed cotton resulting in the loss of an entire module. Conventional rectangular cotton modules weigh in the range of 18,000 to 26,000 pounds and contain 5,000-9,000 pounds of lint cotton so it is easy to see the extent of potential losses.

Disclosures of interest are found in U.S. Pat. Nos. 2,989,252; 4,776,648 and 6,332,426.

SUMMARY OF THE INVENTION

In response to these problems, it has been proposed to make cylindrical cotton modules which are wrapped in plastic in such a manner that the plastic wrap covers the cylindrical sides of the module and part of the ends so water cannot enter the module to an extent sufficient to damage a significant part of the cotton. In a way, cylindrical is a slight misnomer because the modules are often flat on the bottom after sitting on the ground for an extended period or have bumps and valleys in the perimeter. These modules are often called round modules which is equally a misnomer for the same reasons. A significant problem is that not all modules are full size and some modules are not cylindrical. In addition to humps and hollows, a significant number of modules are tapered. Any system intended for wide acceptance must be flexible enough to handle normal variations in size and shape.

The current generation of cylindrical modules is about one quarter the weight of conventional rectangular modules or about 5,000 pounds. The problem addressed by this invention is to completely remove the plastic wrap in an efficient, expeditious, reliable and inexpensive manner and deliver the unwrapped module into a hopper, which acts as a disperser having an open top rather than the customary open front, so it may be broken apart in a more-or-less conventional manner and delivered to a gin. It is apparent that other fibrous agricultural products may be similarly wrapped, such as corn stover, kenaf, hemp and the like although the problems in unwrapping such modules are very different for reasons which will become apparent. This application is a counterpart to application Ser. No. 11/350,314, filed Feb. 3, 2006, which is incorporated herein by reference.

In one embodiment of this invention, cylindrical cotton modules that are wrapped with a cover are transported by a conveyor toward a hopper where the modules will ultimately be disintegrated. Adjacent an end of the conveyor, the module is picked up off the conveyor so one or more operations may be conducted on it. More specifically, the module is picked up and rotated for one or more reasons, usually to find an identifying device indicating the origin of the module, to locate a loose tail of the wrapping, to slit the module in a location that leaves the loose tail intact and then to unwrap the protective cover from the module contents.

Preferably before the module is slit, the plastic wrapping is grasped in such a manner that it is prevented from falling or being dragged into the hopper, for reasons more fully apparent hereinafter. The module is slit at a location adjacent and above the hopper so that any cotton spilling from the module falls, or is induced to fall, into the hopper. After the module is slit, it rolls, is pushed or the conveyor discharges it into the hopper so the cotton spills into the hopper and, in one embodiment, the wrapping remains attached to the grasping mechanism. In other embodiments, the wrapping is removed from the module by rotating the module.

It is an object of this invention to provide a method and apparatus for handling cylindrical wrapped modules and removing the wrapping.

Another object of this invention is to provide a technique for removing a cover from cylindrical seed cotton modules in an expeditious manner.

Another object of this invention is to provide a technique for unwrapping a plastic covered module and delivering the contents to a hopper.

A further object of this invention is to provide subsystems for handling the module, specifically slitting the plastic and unwrapping the module.

These and other objects and advantages of this invention will become more fully apparent as this description proceeds, reference being made to the accompanying drawings and appended claims.

BRIEF DESCRIPTION OF THE DRAWINGS

FIG. 1 is a top view of a module feeder of this invention;

FIG. 2 is an isometric view of a wrapped cylindrical module showing the wrap in one rotational direction;

FIG. 3 is an isometric view of a wrapped cylindrical module showing the wrap in the opposite rotational direction;

FIG. 4 is a top view of another embodiment of a module feeder of this invention;

FIG. 5 is an enlarged cross-sectional view of the hopper shown in FIG. 4, taken substantially along line 5-5 thereof as viewed in the direction indicated by the arrows;

FIG. 6 is a partial enlarged isometric view of a disperser drum used in the hopper of FIG. 5;

FIG. 7 is a top plan view of a conveyor used in another embodiment of this invention;

FIG. 8 is a side view of the conveyor of FIG. 7 illustrating a raising and rotating device in a retracted position where it acts as part of the conveyor;

FIG. 9 is a view similar to FIG. 8, illustrating the raising and rotating device in a position to rotate the module;

FIG. 10 is a view similar to FIGS. 8-9 illustrating the raising and rotating device in a position to roll the module into the hopper;

FIG. 11 is another embodiment of a roller bed conveyor usable in this invention;

FIG. 12 is a top plan view of a conveyor used in another embodiment of this invention;

FIG. 14 is a view similar to FIG. 13 illustrating the raising and rotating device in a position similar to FIG. 9 to rotate the module.

FIG. 19 is an isometric view similar to FIG. 16 illustrating another embodiment of the follower wheels that position the ends of the plastic wrap inlet conveyor;

FIG. 20 is an isometric view similar to FIG. 17 illustrating the follower wheels of FIG. 18 in an operative position;

FIG. 21 is a view, similar to FIG. 5 showing another embodiment of this invention;

FIG. 22 is an enlarged view of a grappler shown in FIG. 21;

FIG. 23 is an isometric view of another embodiment of this invention;

FIG. 27 is a view of the gantry showing the module 12 in the process of being picked up;

DETAILED DESCRIPTION

Figure 13:
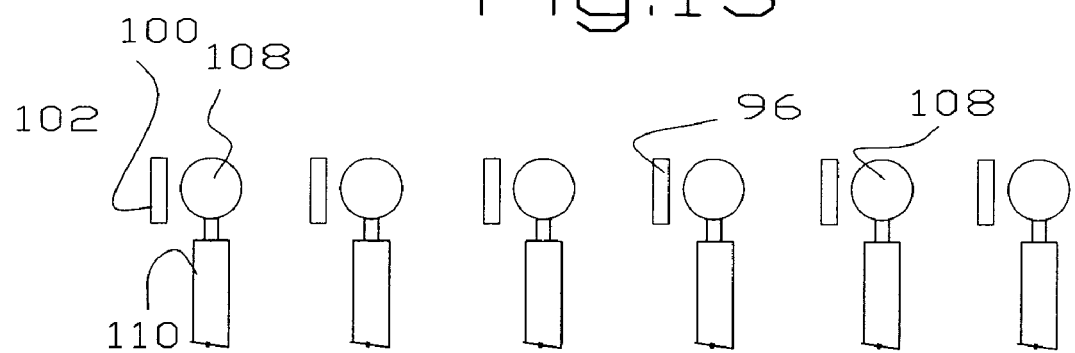
FIG. 13 is a end view of the conveyor of FIG. 12 illustrating a raising and rotating device in an inoperative retracted position.
Figure 15:
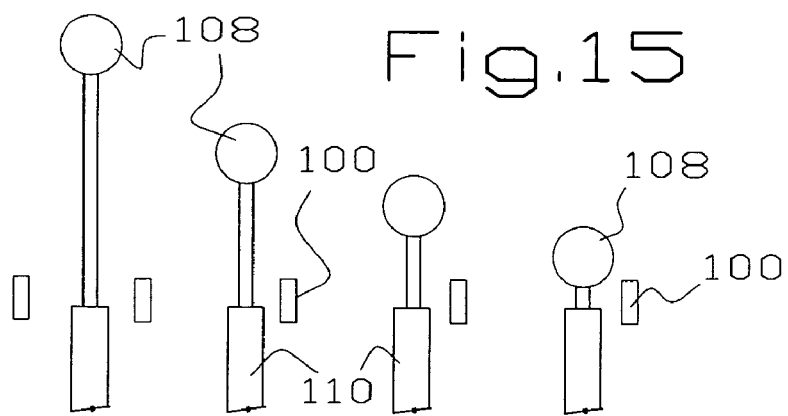
FIG. 15 is a view similar to FIGS. 13-14 illustrating the raising and rotating device in a position to roll the module into the hopper

Referring to FIG. 1, there is illustrated a module feeder 10 of a type that is capable of handling cylindrical seed cotton modules 12 that are wrapped with a cover or wrapping 14 that is sufficient to shed water. The current cover proposed for use in wrapping seed cotton modules is an organic polymer, or plastic, but it will be understood that this invention is usable with any suitable material that is effective to shed water and it is desired to keep the wrapping material out of the ginned cotton. The current version of the plastic cover is wrapped a plurality of times around the seed cotton and relies on stretch film technology and an adhesive to secure adjacent wraps of the plastic to each other. It will be understood that other suitable techniques for adhering the cover to itself will be apparent to those skilled in the art, such as high or low temperature shrink wrapping techniques, heat sealing techniques, twine, or combinations thereof, and the like. As used herein, the word adhere or adhered is used to describe any suitable technique for securing adjacent wraps of the cover to itself.

The module feeder 10 comprises, as major components, a conveyor 16 for delivering the cotton modules 12 toward a hopper 18, which acts as or is analogous to a disperser, where the modules 12 are disintegrated and a device 20 upstream of the hopper 18 for removing the wrapping 14.

An overriding problem with plastic wrapped cotton modules 12 is that the plastic must be completely removed and not allowed to enter the gin where cotton fibers are separated from cotton seed. The reason is that cotton is used to manufacture threads, yarns and ultimately textiles and the presence of plastic in the ginned cotton is completely unacceptable to textile manufacturers because it will ruin large batches of produced yarn and/or textiles, mainly because it will not take dyes and other textile treatments.

As shown in FIGS. 2 and 3, one of the peculiarities of current generation of plastic wrap 14 is that most of it is adhered or adhesively secured to the underlying or overlying material except for a tail 22 on the inside of the wrapping 14 which is not adhered to the overlying wrap. Current round module builders leave about six feet of unadhered tail 22 in a module of nominal eight foot diameter. The tail 22 is unadhered because of the nature of the device that wraps the plastic 14 around the seed cotton. The presence of the tail 22 creates a set of problems in removing the plastic wrapping 14 because the wrapping 14 cannot simply be slit because there is a danger that part of the tail 22 will be severed from the balance of the plastic wrapping 14 and the severed tail 22 will enter the gin, get ground up in some manner and thereby become intermingled with cotton fibers making the ginned cotton fibers unsalable or, worse, getting into a textile operation, ruining a large batch of textiles and creating havoc backwards through the supply chain. It is not a simple matter to adhere the tail 22 to the remainder of the plastic wrapping 14 because of inherent situations in the module builder which cannot readily be cured, at least at the present. Although not shown in FIGS. 2 and 3, the cover 14 overlaps the ends of the module 12 so that water cannot wick up into the seed cotton when the module 12 is laying on its side. This degree of overlap is currently on the order of two to four inches.

One peculiarity in the operation of cotton gins is that it is very desirable to provide a consistent flow of cotton to the gin stands in order to promote high sustained rates of cotton going through the gin. Although cotton gins have some surge capacity, it is quite limited and there is no assurance that the surge capacity will be full when there is a reduction in cotton flow from the module feeder toward the gin stands caused by the module feeder. As contrasted to the counterpart copending application, in this invention the provision of the hopper and the ability to keep it more-or-less loaded provides more-or-less consistent cotton feed rates regardless of the orientation of the module relative to the hopper.

Figure 31:
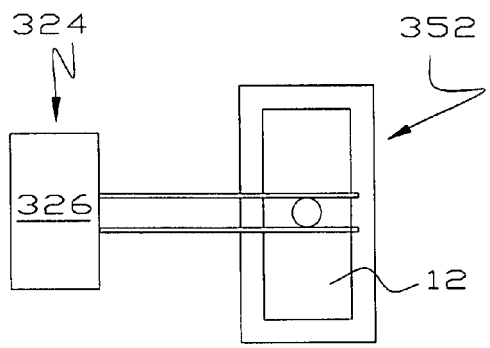
FIG. 31 is a top view of the loader of FIG. 28 approaching a hopper with no conveyor.

In the embodiment of FIGS. 1 and 4, it is much preferred to roll the cotton modules 12 into the hopper 18. Accordingly, one of the first decisions that needs to be made in the design of this invention is the path of the conveyor 16 used to transport the modules 12 toward the hopper 18. There are generally three possibilities: (1) place the hopper 18 at the end of the conveyor 16 as in FIG. 1 and place the modules 12 on the conveyor with the module axis 24 perpendicular to the path of movement 26, (2) arrange the conveyor 16 parallel to the hopper 18 and place the modules 12 on the conveyor so they are end-to-end, as in the module feeder 28 of FIG. 4 or (3) drop the modules 12 directly into the hopper as shown in FIG. 31.

A problem with picking up and rotating the cotton modules 12 is in positioning the device 20 so it picks up the module with no overlap, i.e. no attempt is made to pick up the front end of one module and the back end of an adjacent module. The device 20 of FIGS. 1 and 4 is conveniently the same as in copending application Ser. No. 11/350,314 and comprises a subsystem to pick up and rotate the module 12, a subsystem to slit the cover 14 and a subsystem to grab the cover 14. The subsystems are coordinated to pick up the module 12, rotate it to locate the tail 22, slit the cover 14 away from the tail 22 and unwrap the slit cover 14 so it does not follow the cotton into the gin.

One of the characteristics of cylindrical modules is that they are the same length, i.e. from end to end, but vary considerably in diameter depending on how much cotton is delivered into the wrapping device. This allows the pick up subsystem to be made slightly shorter than the length of the modules 12. In the module feeder 10 of FIG. 1, a sensor 30 such as an photocell is provided to detect a side of the module 12. The gantry and picking up subsystem of copending application Ser. No. 11/350,314 is rotated 90° relative to that shown in the copending application because the module 12 is similarly rotated. The sensor 30 is connected to the motor (not shown) operating the conveyor 16 to stop the conveyor 16 at a suitable position. In the module feeder 28 of FIG. 4, the sensor 30 detects the front of the module 12.

As explained at some length in application Ser. No. 11/350,314, another problem in handling plastic wrapped cylindrical cotton modules 12 is that the handling or conveying equipment cannot tear the plastic to any substantial extent. The reason is that small pieces of plastic, from the tear, tend to separate from the major part of the plastic wrap, enter the gin and become intermingled with ginned cotton. It will accordingly be seen that many types of conveying equipment commonly used in handling conventional rectangular cotton modules are unacceptable when handling plastic wrapped cotton modules. Although the conveyor 16 is illustrated as a slat type conveyor, it will be appreciated that other types of conveyors are suitable, provided they do not tear the plastic wrapping to any appreciable extent, such as chain bed conveyor modified to eliminate tearing of the plastic wrap, a roller bed conveyor modified to eliminate tearing of the plastic wrap, a belt conveyor or a moving/walking floor conveyor. It will be apparent that the conveyor 16 may be made in one segment or as many segments as are desired.

Another peculiarity of plastic wrapped cylindrical cotton modules is that the direction of the wrapping will vary. Some of the modules 12 will be placed on the conveyor 16 so that the wrap is in one direction, suggested in FIG. 2, and other modules 12 will be placed on the conveyor 16 so that the wrap is in the other direction, suggested in FIG. 3. Because of the unadhered tail 22 or because it is decided to unwrap the plastic 14, it is often desirable to be able to accommodate cylindrical plastic wrapped cotton modules where the wrap is in either direction. This may be accomplished before the module 12 is placed on the conveyor 16 by orienting the modules 12 in a given direction. It is preferred, however, to design the device 20 to handle modules with the plastic wrapped in either direction and one suitable solution is disclosed in copending application Ser. No. 11/350,314.

Some round modules will be tapered. If a tapered module is rotated in one direction to find an identifying tag and/or to locate the tail, the plastic is slit and then the module is rotated in the same direction, the module tends to wander, i.e. move in the direction of the small end of the taper. This can be avoided by rotating the module in one direction to find the identifying tag and/or to locate the tail and then rotate the module in the opposite direction to unwind the plastic. Because all of the operating components are under the control of a computer 21, it can be programmed to drive the rotating elements in opposite directions.

Given the requirements not to disrupt normal ginning operations and not introduce plastic into the gin, it will be apparent that many constraints are imposed on the design of equipment to remove plastic wrapping from cotton modules.

Because the modules 12 are dumped into the hopper 18 after removing the plastic wrapping 14, and the hopper 18 always has some undigested cotton module in it, there is no huge concern about the modules 12 being abutted on the conveyor 16, as in the device shown in application Ser. No. 11/350,314. Thus, a single stage conveyor 16 is acceptable. If it is desired to abut the modules 12 near the hopper 18, a two stage conveyor may be used so the inlet conveyor can be run faster than the outlet conveyor to reduce any gaps between the conveyors.

The hopper 18 may be of any suitable type such as shown in U.S. Pat. Nos. 2,989,252 or 4,766,648. The hopper 18 is illustrated having an upwardly open housing 32 having a low side 34 adjacent the conveyor 16 and a high side 36 lined with a series of disperser drums 38 of more-or-less conventional design. The disperser drums 38 comprise a large stout pipe section 40 from which extend a series of teeth 42. The pipe sections 40 extend through bearings (not shown) in the ends of the hopper 18 and are rotated by a suitable motor (not shown) and drive connection (not shown) so that cotton in the module 12 is digested and drawn through a hopper outlet 44 by a vacuum system (not shown) typically used by cotton gins to deliver cotton clumps from a module feeder to the gin stands.

The device 20 for removing the plastic wrap 14 may take several different approaches. Although it is possible to unwrap the plastic 14 from the modules 12, it is currently considered easier to slit the plastic wrapping 14 and then remove it. Accordingly, the device 20 comprises, as major components or subsystems, a subsystem for lifting and rotating the modules 12, a slitter 46 for cutting the plastic wrapping 14 and a mechanism 48 for grabbing onto the plastic wrapping 14 so the module contents may be dumped or encouraged to fall into the hopper 18 by one mechanism or other.

One approach for raising the module 12 off the conveyor 16, slitting the plastic wrapping 14 and grabbing onto the plastic wrapping 14 is shown in application Ser. No. 11/350,314. In the module feeder 10 of FIG. 1, the only modification of this approach is to rotate the gantry 90° because the modules 12 are similarly rotated. After the plastic wrapping 14 is slit and removed from the module 12, the conveyor 16 is actuated to discharge the module 12 off the end of the conveyor 16 into the open top of the hopper 18. It will be realized, of course, that the gantry shown in application Ser. No. 11/350,314 need not be moved forwardly at the same rate of movement as the conveyor because, in this invention, the conveyor 16 may be periodically stopped while the plastic wrap 14 is being slit and removed.

For use in the embodiment of FIG. 4, two desirable modifications are indicated. First, a pusher 50 is needed to discharge or encourage the module contents to fall off the side of the conveyor 16, as shown in FIGS. 4-5. Second, it is preferred that the slitter 46 be positioned to slit the plastic wrap 14 on the side of the module 12 in an area 52 near the conveyor 16. This has two advantages. Although some of the cotton modules are somewhat structurally sound even with the plastic wrapping removed, many of the modules disintegrate substantially when the plastic wrapping 14 is slit. With these modules, much of the contents will simply fall off the side of the conveyor 16 into the hopper 18. In addition, by slitting the plastic wrapping 14 in the area 52, and by action of the pusher 50, the plastic wrapping 14 remains for some time on the conveyor 16, meaning that the plastic wrapping 14 helps cotton to fall off the side of the conveyor 16 rather than collecting on the conveyor 16 and thereby being discharged off the end of the conveyor 16. It will, of course, be evident to those skilled in the art that a vacuum collection system 54 may be provided at the end of the conveyor 16 in the embodiment of FIG. 4 to overcome this problem. Although the slitter 46 may be arranged to slit the module 12 on one side, e.g. at the 3-4 o'clock position, it is preferred to slit the module from about 11 to about 2 o'clock. One advantage of slitting the module from about 11-2 o'clock is that otherwise, the slitter has to be moved, after slitting the module 12, out of the path of movement of the module 12 as it falls or is pushed into the hopper 18.

It will accordingly be seen that the pusher 50 includes an enlarged preferably curved pusher plate 56 pivotally connected to the output rod 58 of a hydraulic cylinder 60 which is pivotally mounted to a suitable support by trunnions 62 or other similar connection to push the module 12 off the conveyor 16 into the hopper 18, preferably over the low side 34. A desirable feature of the pusher 50 is a robust reaction member 64 between the conveyor 16 and the hopper 18 to act as a fulcrum or support for the module 12 to roll off of, rather than reacting against the edge of the conveyor 16. It will accordingly be seen that the module 12 is readily pushed off the conveyor 16 into the hopper 18.

Another technique for removing the plastic wrapping 14 is shown in FIGS. 7-10. This technique requires a conveyor having openings parallel to the direction one wishes to rotate the modules 12. In the module feeder 66 of FIG. 7, this means the openings have to be perpendicular to the direction of movement 74, meaning that the conveyor 68 has to be a roller bed conveyor or of a similar type to deliver the modules 12 into a hopper 70. The conveyor 68 includes a series of first rollers 72 which are rotatably powered in any suitable fashion for rolling the module 12 along a path of movement 74 toward the hopper 70. The rollers 72 are more-or-less conventional in the sense that the roller axes 76 are stationary although the exterior of the rollers 72 may have small cleats 78 to increase friction between the rollers 72 and the modules 12 without tearing the cover 14.

Interspersed between the rollers 72 are a series of powered second rollers 80 which are drivably rotated and in which the roller axes 82 are mounted for vertical movement to produce the situations seen in FIGS. 7-10. In FIGS. 7-8, the rollers 72, 80 act as a standard roller bed conveyor in which both rollers 72, 80 are drivably rotated to transport the modules in the path of movement 74. In FIG. 9, the rollers 80 raise the module 12 and rotate it in order to find the tail 22 and position the module 12 for slitting. In FIG. 10, the rollers 80 have been elevated to roll or otherwise discharge the module 12 off the end of the conveyor 68. To these ends, each of the rollers 80 is mounted on the end of one or more cylinders 84. In FIG. 9, the cylinders 84 are synchronized in a suitable manner to cause the conveyor 68 to raise and rotate the module 12. In FIG. 10, the cylinders 84 are synchronized in a suitable manner to roll or slide the contents of the modules 12 off the end of the conveyor.

It will be seen that the rollers 72 may be driven in any conventional manner, e.g. by a chain-sprocket drive. The rollers 80 preferably include an internal motor (not shown) for rotating the outer surface, as disclosed in Ser. No. 11/350,314 and include one or more cleats 86 for increasing friction between the module 12 and the rollers 72, 80 without tearing the plastic cover 14.

As shown in FIG. 9, the module feeder 66 is equipped with a slitter 88 to cut the cover 14 and a grasping mechanism 90 to hold the cover 14 as the module 12 rolls into the hopper 70. Operation of the module feeder 66 should now be apparent. The module 12 moves along the path of movement 74, either rolling or simply being conveyed depending on the frictional forces involved, until it reaches the end of the conveyor 68. The location of the module 12 is sensed by a detector 92 which stops the conveyor 68 and initiates movement of the cylinders 84 and rollers 80. As shown in FIG. 9, the rollers 80 accordingly raise and rotate the module 12 to detect the tail 22, actuate the grabber 90 and actuate the slitter 88, moving it if necessary from a stowed location to an operative position to cut the cover 14, all as disclosed in copending application Ser. No. 11/350,314. The rollers 80 are then moved to the position shown in FIG. 10 so the contents of the module 12 roll off, or slide off, into the hopper 70. It will be seen that the contents of the module 12 are largely prevented from falling through the conveyor 68 because a section the cover 14, away from the location where it is slit, is on the underside of the module 12, i.e. between the module 12 and the conveyor rollers 72, 80.

To provide a more certain technique to prevent cotton from falling between the rollers 72, 80, there may be provided a resilient sheet 93 or series of flaps, made of rubber or the like, between the stationary and movable rollers 72, 80. Any cotton collecting on the sheet 93 may be collected in any suitable manner, as by making the sheet 93 slightly inclined to one side thereby allowing cotton to slide off into a collection device.

An alternate arrangement is shown in FIG. 11 where a conveyor comprises rollers 94 which remain in a conveying plane and rollers 95 which are moveable from the conveying plane to a tilted position allowing the module to roll off into a disperser or hopper. Rigid metal sheets 96 extend between the rollers 95 and act in the same manner as the resilient sheets 93 in FIG. 9.

A similar module feeder 98 is illustrated in FIGS. 12-15. The module feeder 98 is similar to the module feeder 28 in that the conveyor 99 is located on the side of the hopper 100 and the module is discharged or rolled off the side of the conveyor 99. In this situation, the conveyor 99 is a chain bed conveyor having a series of parallel chains 101 extending along the path of movement 102 in elongate grooves 104 provided in a bed or plate 106. The chains 100 extend beyond the end of the bed 106 to provide gaps for a series of rollers 108, similar to the rollers 80, for raising, rotating and then discharging the module 12 into the hopper 98.

As shown best in FIGS. 12-13, the module 12 is transported by the conveyor 99 past the end of the bed 106 onto the rollers 108. When it is desired to locate the tail 22 and then slit the cover 14, fluid is delivered to hydraulic cylinders 110 to raise the rollers 108 which are powered by internal hydraulic motors (not shown) to rotate the modules 12 to locate the tail 22 and then position the module so the cover 14 can be cut by a slitter 112 and grasped by a grabber 114.

Operation of the module feeder 98 should now be apparent. The modules 12 are transported by the conveyor 99 to the end of the chains 101 as sensed by a sensor 116 which stops the chain bed conveyor 99 and starts operation of the rollers 108. The cylinders 110 are initially operated to position the rollers 108 as shown in FIG. 14 where the module 12 is rotated to locate the tail 22 and then operate the slitter 112 to cut the cover 14. The cylinders 110 are then operated to position the rollers 108 in the position shown in FIG. 15 where the contents of the module 12 roll off or slide off the elevated rollers 108 into the hopper 100. It will accordingly be seen that operation of the rollers 108 is much the same as operation of the rollers 72.

The slitters usable with this invention may be of any suitable type, such as shown in copending application Ser. No. 11/350,314.

Although the details of the grabbers of this invention may be the same as in copending application Ser. No. 11/350,314, they may be different as suggested in FIGS. 16-18 where a module 12 is in the process of having its plastic wrapper 14 removed. After the module 12 is picked up off the underlying conveyor, in any one of a plurality of manners, the module 12 is rotated to find the identifying tag 117, which may be of any suitable type, and/or to locate the tail 22 so the module 12 is positioned so it may be slit. A slitter 118 of any suitable type is lowered so its knives 120 cut the plastic wrap 14 from one end of the module 12 to the other, providing a leading edge 122 and a trailing edge 124. The slitter 118 is then raised out of the way.

In a preferred embodiment, the identifying tag 117 is an RFID device, i.e. a radio frequency identification device. A reader 121 for the RFID tag 117 is located adjacent the slitter 118. It is preferred to rotate the module 12 in one direction to locate the tag 117 and then rotate the module 12 in the opposite direction to unroll the plastic wrap 12. Thus, in FIG. 16, the module 12 is rotated clockwise to locate the tag 117 and then counterclockwise to unroll the slit plastic wrap 12. With the module 12 being rotated in a clockwise direction, a potential problem with using an RFID tag 117 in this situation is that the reader 121 is prone to detect the tag 117 at an 8-9 o'clock position as suggested in FIG. 16. This occasionally causes the computer 21 to assume that the tag 117 is at a 10-11 o'clock position and cause the computer 21 to operate the slitter 118 so the unadhered tail 22 is cut off. To avoid the reader 121 from prematurely detecting the RFID tag 117, the slitter 118 is lowered toward the module 12 a suitable distance, e.g. two feet, to interpose between the reader 121 and the tag 117 before rotation of the module 12 begins. In other words, the slitter 118 is used to cast a shadow over the module 12 and thereby prevent the tag 117 from being sensed prematurely. By appropriately positioning the slitter 118, or any other shiftable member, the RFID reader 121 becomes more directional. It is preferred that the tag 117 be sensed consistently at the 10-11 o'clock position.

In one embodiment, the slitter 118 includes wheels 119 that abut the module 12 and thereby position the rotatable cutting wheels or knives 120 appropriately relative to the plastic wrap 14. An important feature of the slitter 118 is that it is moved parallel to the axis 24 of the module 12 so that the wheel 119 runs off the end of the module 12 to cut that portion of the plastic wrap 14 that overlaps the end of the module 12. This allows the cutting wheel 120 to slit the overlapped end of the plastic wrap 14 without having to cut deeply into the cotton inside the plastic wrap 14.

In a preferred embodiment, the slitter 118 includes a range finder 123 that determines the distance to the module 12 and thereby manipulates a motor (not shown) or other suitable moving device to lower the slitter 118 to the module 12. Although the range finder 123 may be of any suitable type, it is preferably a laser range finder such as is available from IFM Effector, Inc. of Exton, Pa. as a model 01D100. In use, the range finder 123 determines the location of the surface of the module 12 and thereby moves the slitter 118 up and down to maintain a desired cutting position of the cutting wheels or knives 120 relative to the module 12. Thus, the range finder 123 causes the slitter 118 to follow the contour of the module 12 which is of importance because modules 12 are prone to have humps, bumps and hollows or be tapered. If the cutting wheel 120 is inserted too far into the module 12, there is a tendency of the wheel 120 to scorch cotton fibers in the module thereby preventing a danger of fire. If the cutting wheel 120 is raised too far away from the module 12, it is ineffective to slit the plastic wrap 14. By using the range finder 123 to adjust the position of the slitter 118 as it is slicing the plastic wrap 14, these problems are obviated.

A grabber 126 is provided to grasp the slit plastic wrap 14 and pull it off or encourage it to unwrap from the module 12 during rotation of the module 12 in the direction shown by the arrow 128. The normal position of the grabber 126 is up and out of the way of the module 12. Before the grabber 126 is operated, the slitter 118 is lowered so the knives 120 cut the plastic wrap 14 and the slitter 118 is then raised to an out of the way position. Then, the grabber 126 is lowered from its frame 130, as by unwinding winches 132, 134 or with hydraulic cylinders (not shown) so a pair of forward conveyors 136, 137 approach the plastic wrap 14 slightly spaced from the leading edge 122 as suggested in FIG. 16.

Figure 16:
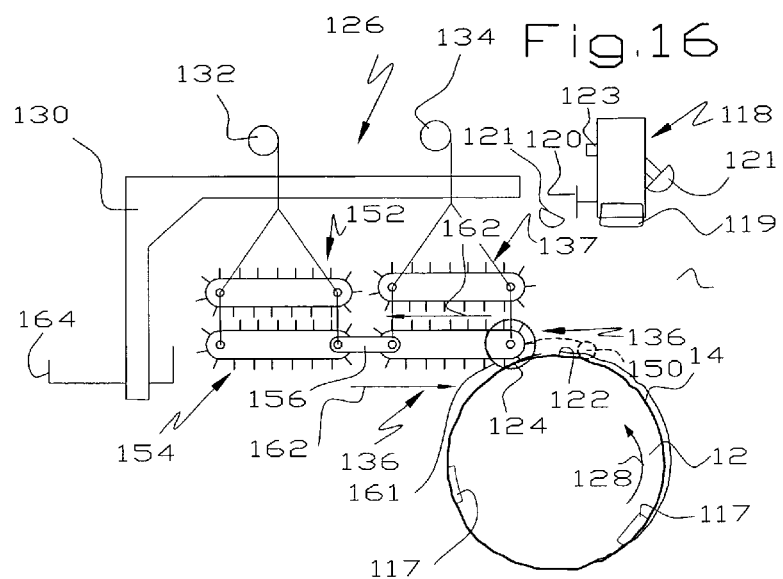
FIG. 16 is a view illustrating a slitter and grabber in an operative position relative to a round module.
Figure 17:
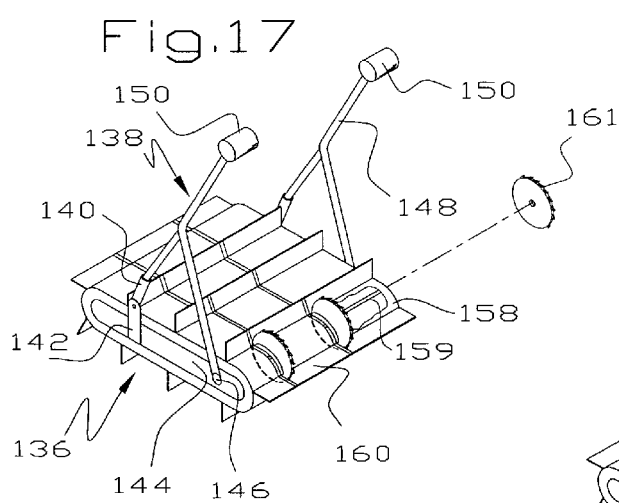
FIG. 17 is an isometric view of part of the grabber shown in FIG. 16.
Figure 18:
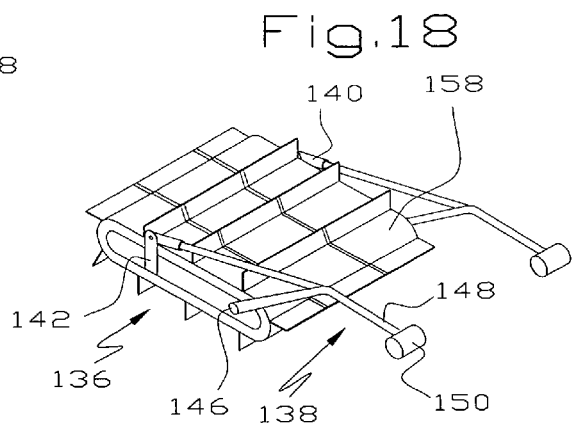
FIG. 18 is an isometric view of the grabber part of FIG. 17 in an operative position.

The conveyor 136 includes a pair of retractable guide wheel assemblies 138 which are normally retracted as shown in FIGS. 16 and 17 to allow the slitter 118 to be lowered to the module 12 without interfering with the wheel assemblies 138. When the slitter 118 has been moved upwardly out of the way, the wheel assemblies 138 are extended forwardly as shown by a comparison of FIGS. 17 and 18, as by the use of hydraulic or pneumatic cylinders 140 mounted on brackets 142 to a frame 144 of the conveyor 136. To this end, the wheel assemblies 138 include a pivot connection 146 to the frame 144 and an arm 148 which may be bent to provide the necessary clearance and/or reach on which is rotatably mounted a wheel 150. The arms 148 are pivoted to the position shown in FIG. 18 into engagement with the module 12 and the cylinder 140 is then locked at the end of its stroke, as by closing its inlet and/or outlet valve (not shown). When the module 12 is rotated in the direction shown by the arrow 128, the wheels 150 roll on the plastic wrap 14 as suggested by the dotted lines in FIG. 16 and thereby move the front end of the conveyor 136 to track the shape of the module 12. This is important because the round bales often have a flat spot on one side where they have contacted the ground and because the exterior of the module often includes irregular bumps and valleys. It will be seen that the guide wheels 150 contact the plastic wrap 14 and raise or lower the front end of the conveyors 136, 137 so they are always positioned, in a simple manner, to receive the leading edge 122 of the plastic wrap 14. In the alternative, a laser range finder similar to range finder 123 may be used, in conjunction with the computer 21 and suitable motors (not shown) to control the height of the grabber 126 rather than using the mechanical action of the wheels 150.

The grabber 126 includes a pair of rear superposed conveyors 152, 154 similar to the conveyor 136 raised and lowered by the winch 132. The conveyor 136 may be independent of the conveyors 152, 154 or may be ganged together by a link 156 so the front conveyor 136 may pivot relative to the rear conveyors 152, 154. This is an important feature of the grabber 126 because allowing the lower forward conveyor 136 to pivot freely allows the wheels 150 to follow the exterior of the round bale 12 thereby correctly positioning the inlet end of the conveyor 136 relative to the slit ends 122, 124 of the bale 12.

The broad idea is for the conveyor 136 to separate the leading edge 122 of the plastic wrap 14 and propel or encourage it to move in a predetermined path so the plastic wrap 14 is removed from the module 12 during rotation of the module 12. To this end, the conveyor 136 preferably includes several side-by-side endless belts 158 driven about a suitable forward shaft 159 and having vertical flaps 160 thereon acting like paddles. Fixed on the ends of the shaft 159 and between the adjacent belts 158 are a series of serrated wheels 161 that engage the plastic wrap 14 and provide a substantial frictional force peeling the forward end 122 of the plastic wrap 14 away from the bale 12. As the leading edge 122 is rotated under the conveyor 136, the flaps 160 and serrated wheels 161 are moving in the opposite direction as suggested by the arrow 162 thereby separating the plastic wrap 14 from the module 12 and moving it on top of the conveyor 136 and below the conveyor 137. It is desired that the flaps 160 and serrated wheels 161 engage the forward end 122 of the wrap 14 and not the rearward end 124. Depending on the location of the slitter 118 and the location of the cut relative to the grabber 126, it may be necessary to rotate the bale 12 slightly after it is slit. As the plastic wrap 14 moves off the conveyor 136, it passes between the over-and-under conveyors 152, 154 and is discharged to the side of the frame 130 in a storage area or bin 164.

It has been learned that the rigidity of the flappers 160 has some effect on the operation of the grabber 126. In the absence of the serrated wheels 161, it is preferred that the flappers 160 on the forward conveyors 136, 137 be more rigid than the flappers 160 on the rearward conveyors 152, 154.

It will be seen that the grabber 126 is capable of articulated movement in the sense that the elevation of the rear conveyors 152, 154 can be adjusted by the winch 132 independently of the winch 134. This is of advantage when the construction of doors (not shown) preventing cotton from falling off to the side are high enough to interfere with lowering the grabber 126 to reach a module of smaller than full diameter. Because the forward conveyors 136, 137 are pivoted by the link 156 to the rearward conveyors 152, 154, the forward conveyors 136, 137 are capable of reaching a smaller than normal diameter module.

It will be apparent that the various embodiments of the grabbers and/or the slitters are equally usable in the device shown in application Ser. No. 11/350,314.

An important feature of this invention is shown in FIGS. 1, 4 and 5. After the plastic wrap 14 has been slit and removed from the module 12, the cotton previously encapsulated in the plastic wrap 14 is no longer constrained. Sometimes, the module stays remarkably intact. Sometimes, the module falls apart with the cotton flowing where it will. Most of the time, there is a middle ground where the cotton simply slumps in place or there is a core of compacted cotton with the remainder flowing where it will. It will be seen there is a need to constrain cotton from flowing off the conveyor 16 in an undesired direction after the plastic wrap 14 has been slit. To this end, the embodiment of FIG. 1 includes a pair of parallel vertical walls 166, 168 immediately adjacent the edge of the conveyor 16. The embodiment of FIGS. 4 and 5 includes a pair of perpendicular walls 170, 172 for this purpose, the wall 172 merging with the side of the hopper 18.

Referring to FIGS. 19 and 20, there is illustrated a conveyor 174, analogous to the conveyor 136, having slightly different wheel assemblies 176 which are normally retracted as shown in FIG. 19 to allow a slitter to be lowered to the module 12 without interfering with the wheel assemblies 176. When the slitter has been moved upwardly out of the way, the wheel assemblies 176 are extended forwardly as shown by a comparison of FIGS. 19 and 20, as by the use of hydraulic or pneumatic cylinders 178 mounted on brackets 180 to a frame 182 of the conveyor 174. To this end, the wheel assemblies 176 include a pivot connection 184 to the frame 182 and an arm 186 which may be bent to provide the necessary clearance and/or reach on which is rotatably mounted a wheel 188. The arms 186 are pivoted to the position shown in FIG. 20 into engagement with the module 12 and the cylinder 178 is then locked at the end of its stroke, as by closing its inlet and/or outlet valve (not shown). When the module 12 is rotated in the direction shown by the arrow 128, the wheels 188 roll on the plastic wrap 14 as suggested by the dotted lines in FIG. 15 and thereby move the front end of the conveyor 174 to track the shape of the module 12. This is important because the round bales often have a flat spot on one side where they have contacted the ground and because the exterior of the module often includes irregular bumps and valleys. It will be seen that the guide wheels 188 contact the plastic wrap 14 and raise or lower the front end of the conveyor 174 so it is always positioned, in a simple manner, to receive the leading edge 122 of the plastic wrap 14. It will accordingly be seen that the guide assemblies 176 move in a plane that is essentially parallel to the conveyor 174 while the guide assemblies 138 move in a plane essentially perpendicular to the conveyor 136.

Referring to FIGS. 21-22, there is illustrated another embodiment of a module feeder 190 of this invention. The module feeder 190 comprises a conveyor 192 of any suitable type for conveying the module 12 toward a discharging position adjacent a hopper 194. Instead of raising the module 12 and locating the tail 22 in order not to amputate it, a grappler 196 is provided to impale the plastic cover 14. To this end, the grappler 196 comprises a plurality of pairs of curved spikes 198 which impale the plastic cover 14 when advanced downwardly into engagement with the module 12, as by the use of hydraulic cylinders 200, 202. An actuating mechanism 204 is provided to manipulate the spikes 198 between an open position shown in FIG. 21 and a closed position where the spikes impale the plastic cover 14.

The grappler 198 is preferably moved into engagement with the module 12 and the spikes 198 closed to impale the plastic cover 14 before the slitter 206 is lowered to slit the cover 14 from end to end. The concept is that the grappler 196 will so thoroughly grasp the plastic cover 14 that the module contents can be rolled off the position shown in FIG. 21 into the hopper 194. In this manner, the module 12 does not have to be raised and the tail 22 does not have to be located because the grappler 196 is securely holding the tail 22, however small.

A pusher 208 similar to the pusher 50 accordingly pushes on the plastic cover 14 and thereby pushes the module contents toward the hopper 194. Because the slitter 206 cuts the plastic cover 14 as close as possible to the spikes 198 at a location about 12 o'clock, a substantial length of the plastic cover 14 unfolds on the runway 210 thereby assisting the module contents to fall into the hopper 194 rather than fall through the conveyor 192.

Referring to FIGS. 23-28, there is illustrated another module feeder 220 comprising another embodiment of this invention. The module feeder 220 most closely resembles the embodiment of FIG. 1 of copending application Ser. No. 11/350,314 but includes a number of new and improved features. The module feeder 220 comprises, as major components, a conveyor 222 for transporting the round module 12, a device 224 for picking up the module 12 and rotating it, a slitter 226 for cutting the plastic wrap 14, a grabber 228 for removing the plastic wrap 14 from the module 12, and a disperser 230 for disintegrating the module 12 after the plastic wrap 14 has been removed.

The conveyor 222 may be of any suitable type as previously mentioned and acts to transport a series of the modules 12 toward the disperser 230 along a path 232.

Figure 24:
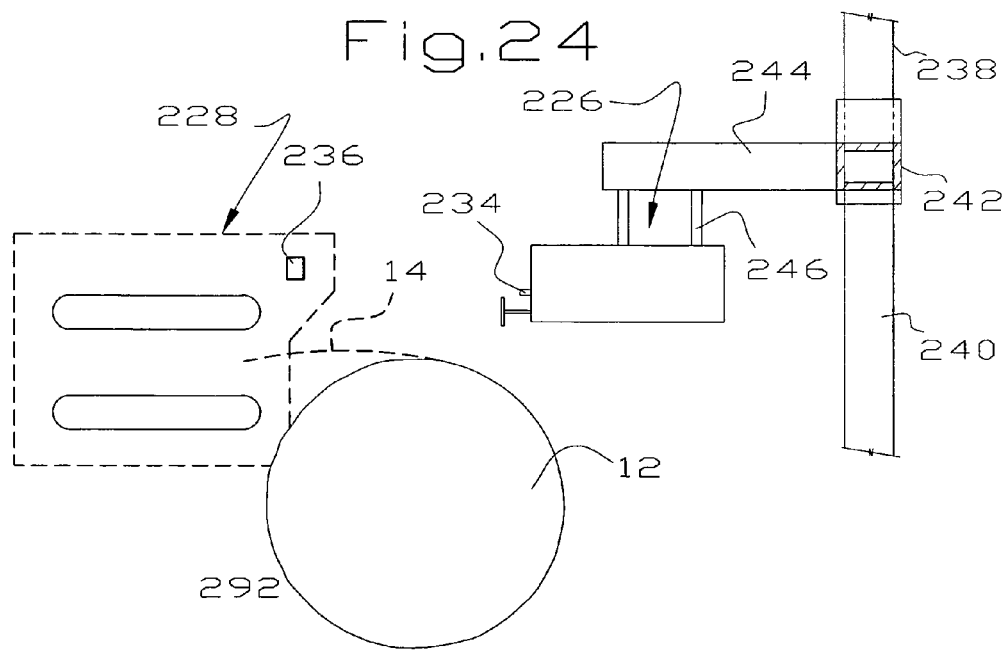
FIG. 24 is a schematic view of a slitter and grabber of this invention.

The slitter 226 and the grabber 228 may be of any of the types disclosed above. Although the slitter 226 and grabber 228 may use only one range finder, as shown in FIG. 24, the slitter 226 and grabber 228 are preferably both equipped with range finders 234, 236 to determine the distance between the operative elements of the slitter and grabber and the round module 12. In this event, the range finder on the grabber 228 often produces erroneous measurements when the plastic wrap 14 is being removed from the module 12. As shown by dashed lines in FIG. 24, when the plastic wrap 14 is being removed from the module 12, it assumes an upwardly inclined position. The range finder 236 often assumes that it is reading the periphery of the round module 12 when, in fact, it is reading the inclined plastic wrap, which is larger than the module 12. When using two range finders, it is usually preferably to control the vertical position of the grabber 228, beginning at a time at least when the plastic wrap 14 becomes inclined.

Also as suggested in FIG. 24, the slitter 226 and grabber 228 are independently raised and lowered in any suitable manner. It is preferred that this mechanism be identical for both the slitter 226 and the grabber 228. A particularly suitable technique is to provide a pair of sleeves 238 slidable up and down on vertical columns 240 on each side of a gantry 242. The sleeves 238 are connected by a beam 244 while a perpendicular beam 246 extends over the conveyor 222. The slitter 226 and grabber 228 are supported by suitable rigid braces 248 or other suitable elements from the beam 246.

Figures 25, 26:
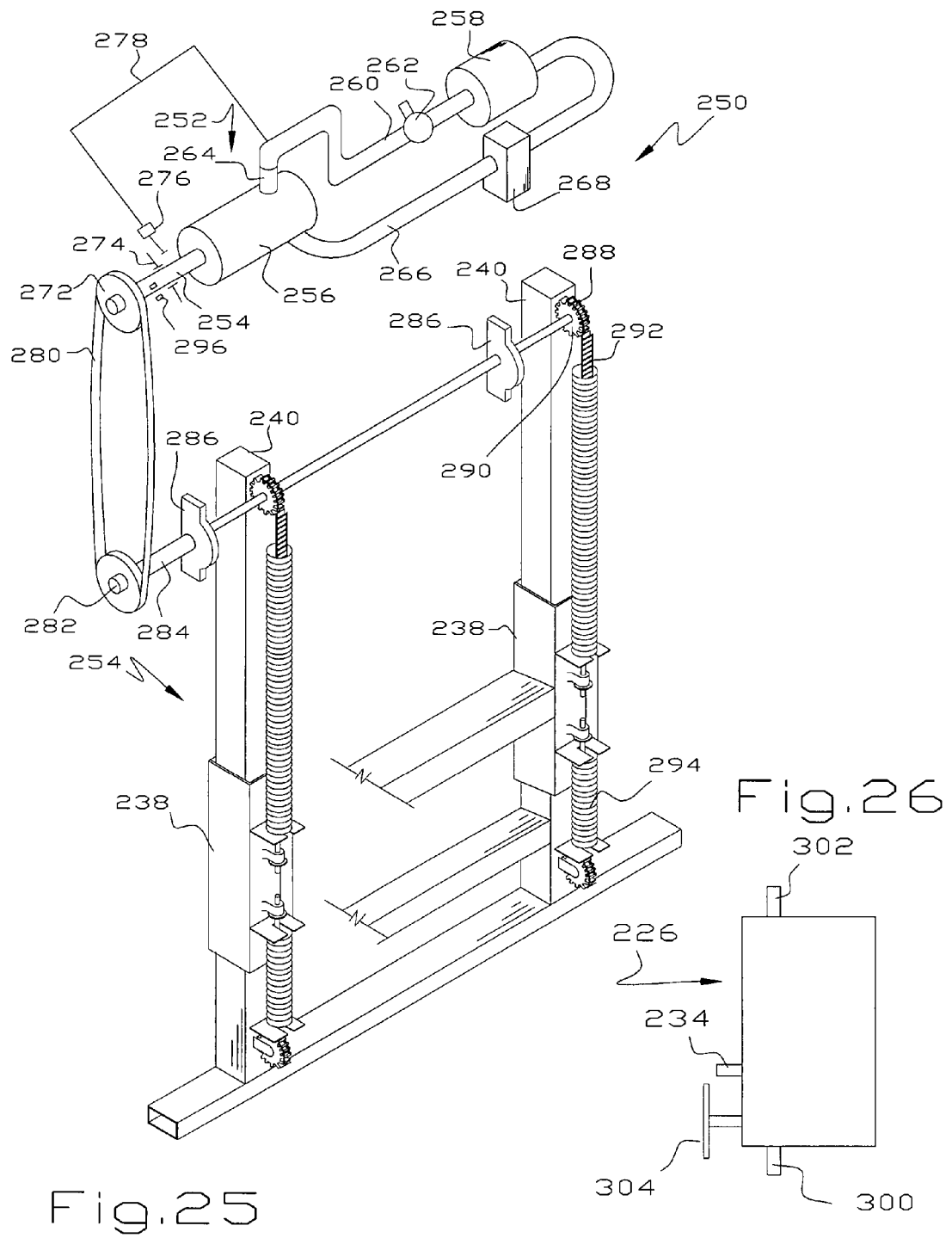
FIG. 25 is a pictorial view of the mechanism for raising and lowering the slitter and/or grabber.
FIG. 26 is a schematic top view of the slitter of FIG. 24.

Referring to FIG. 25, there is illustrated a mechanism for raising and lowering the slitter or any one of the grabbers. The sleeves 238 are mounted for vertical movement on one of the columns 240 of the gantry 242 and are raised and lowered by a mechanism 250 comprising a motor assembly 252 and a chain drive assembly 254. The motor assembly 252 includes a suitable motor 256, preferably hydraulic. The motor 256 is driven by high pressure fluid delivered from a pump 258 through a high pressure inlet line 260 having a solenoid control valve 262 and a check valve 264 mounted directly on the end of the motor 256. A hydraulic return line 266 delivers hydraulic fluid to a reservoir 268 in communication with the pump inlet.

The motor output shaft 270 delivers power to a sprocket 272. A brake 274 is spring biased into engagement with the shaft 270 so the brake 274 is normally set against the shaft 270. A hydraulic release cylinder 276 releases the brake 274 through a line 278 when pump pressure appears in the line 260. It will accordingly be seen that the location of the check valve 264 and the shaft brake 274 constitute safety features preventing, or minimizing, injury in the event the line 260 fails.

A chain 280 extends over the sprocket 272 and meshes with a sprocket 282 rotating a shaft 284 mounted for rotation by bearings 286 mounted on one of the upper beams 288 of the gantry 242. Sprockets 290 are mounted on the shaft 284 and mesh with chains 292. The chains 292 extend over the top of the sprocket 290 and pass through an opening near the top of the column 240, across a bearing near the bottom of the column 240 and then out through an opening near the bottom of the column 240. Each end the chain 292 connects to its associated sleeve 238. It will be seen that rotation of the shaft 284 rotates the sprockets 290 and moves the chain 290 to slide the sleeve 238 upwardly or downwardly. To hide the chains 292 and prevent someone from getting snagged, the chain 292 may be housed inside a conventional flexible bellows 294 such as is available from Heeco Protekto Boots of Tampa, Fla.

The slitter 226 and unwrapper 228 are accordingly raised and lowered by preferably identical devices, specifically the chain drive mechanism of FIG. 25. A shaft encoder 296 on each of the motor shafts 272 delivers a signal to the computer 21 which, when taking into account signals from the range finders 234, 236, allows the slitter 226 and the unwrapper 228 to be lowered into juxtaposition to the module 12 being worked upon. Thus, there is a feedback loop between the drive mechanism 250 and the slitter 226, and between the drive mechanism 250 and the unwrapper 228, that controls raising and lowering of the slitter 226 and unwrapper 228 rather than simply relying on the opening of a valve.

As shown in FIG. 25, the check valve 264 is immediately adjacent the motor 256 to prevent the slitter 226 or the unwrapper 228 from falling in the event the hose 260 fails. There are two related problems: (1) if the hose 260 fails between the motor 256 and the check valve 264, the slitter 226 or unwrapper 228 falls and (2) if the hose 260 fails upstream of the check valve 264, it is possible that the load of the slitter 226 or unwrapper 228 is greater than can be held by the check valve 264. The shaft brake 274 minimizes this problem. The shaft brake 274 is applied each time the slitter 226 or unwrapper 228 is brought to a halt. In order to move the slitter or unwrapper, the brake 274 is released by the application of hydraulic pressure to the motor 256 thereby causing the cylinder 276 to release the brake 274 so the output shaft 270 can turn when the control valve 262 is opened. This prevents the cutter or unwrapper from falling in the event the hose 260 fails when the cutter or unwrapper are stationary. Information from the shaft encoder 296 may be used by the computer 21 to actuate the brake 274 if the shaft 272 starts to turn faster than a preselected limit, either by reducing pressure in the conduit 260 or in a more direct manner, as by venting the conduit 278. The range finder on the various slitters have another safety function. In the event the range finders sense that the slitters are moving too fast in a downward direction, i.e. they are falling, this information may be used by the computer 21 to set the shaft brake 274 in any suitable manner.

Referring to FIG. 26, the slitter 226 has a photoelectric eye 300 or similar sensor looking upstream, i.e. toward the inlet of the conveyor 222, and a photoelectric eye 302 or similar sensor looking downstream, i.e. toward the disperser 230. The purpose is to detect an obstruction and prevent damage to the cutter blade 304 from cutting through the obstruction and thereby prevent damage to the cutter blade 304. The obstruction is normally a module upstream or downstream of the one being worked on. Typically, the module being worked on is a small diameter module and the obstruction is a full sized module that is upstream or downstream. In the event an obstruction is detected, the computer 21 causes the mechanism moving the slitter 226 to reverse movement of the slitter 226 in the direction it is moving and provide an indication to the operator that there is a problem. In this event, control of movement of the slitter 226 passes to the operator at the control panel 21.

Referring again to FIG. 23, the gantry 242 moves toward and away from the disperser 230 by hydraulically powered wheels 306 rather than being pushed by an extensible hydraulic motor. The gantry 242 may be either two wheel drive or four wheel drive as conditions dictate.

Referring to FIG. 27, the gantry 242 will be recognized from FIG. 23 and from the showing in copending application Ser. No. 11/350,314, filed Feb. 3, 2006. It is desirable to move the arms 308 and rollers 310 so the module 12 is raised and lowered without tearing the plastic wrap 14. In one embodiment, this may be done by fixing the speed at which the arms 308 move and by fixing the rate of rotation of the rollers 310 so the rollers 308 roll on the plastic wrap 14 rather than slide relative to it. In a preferred embodiment, a shaft encoder 312 is placed on a shaft of one or more of the rollers 310 on each of the arms 308. Preferably, the shaft encoder is on only one upper roller of each arm 308 so electrical wiring can readily be extended to it. Information from the shaft encoders is delivered to the computer 21 so when the arms 284 are moving at any speed, the rollers 286, 288 can be driven at a speed to accomplish rolling movement on the plastic wrap 14. In other words, the arms 284 can be pivoted toward or away from each other at a variety of speeds and the rollers 286, 288 are driven at a speed so there is no relative movement between the plastic wrap 14 and the periphery of the rollers 286, 288.

Referring again to FIGS. 23 and 27, in previous embodiments, the modules 12 were butted against each other on the conveyor 222 as they pass under the gantry 242. In the earlier embodiments, the concept was to pick up a module 12 from between adjacent modules, remove the wrapper 14 from the module 12 and then set the module 12 down in the same relative place between its abutted modules. The purpose is to promote relatively even cotton input into the disperser 230. By changing the software in the computer 21, and therefore changing the actuation of the conveyor 222, the arms 308, the slitter 226 and the like, the modules 12 do not have to be butted together as they pass under the gantry 242. Instead, a module 12 which has had the plastic wrap 14 removed can be butted against an upstream module and accomplish the same thing, i.e. promote relatively even cotton input into the disperser 230. In this embodiment, an input conveyor upstream of the conveyor 222 is manipulated to provide a larger gap between modules 12 so a sensor, such as a laser range finder similar to range finders 234, 236, can more readily detect the gap between adjacent modules.

Figure 28:
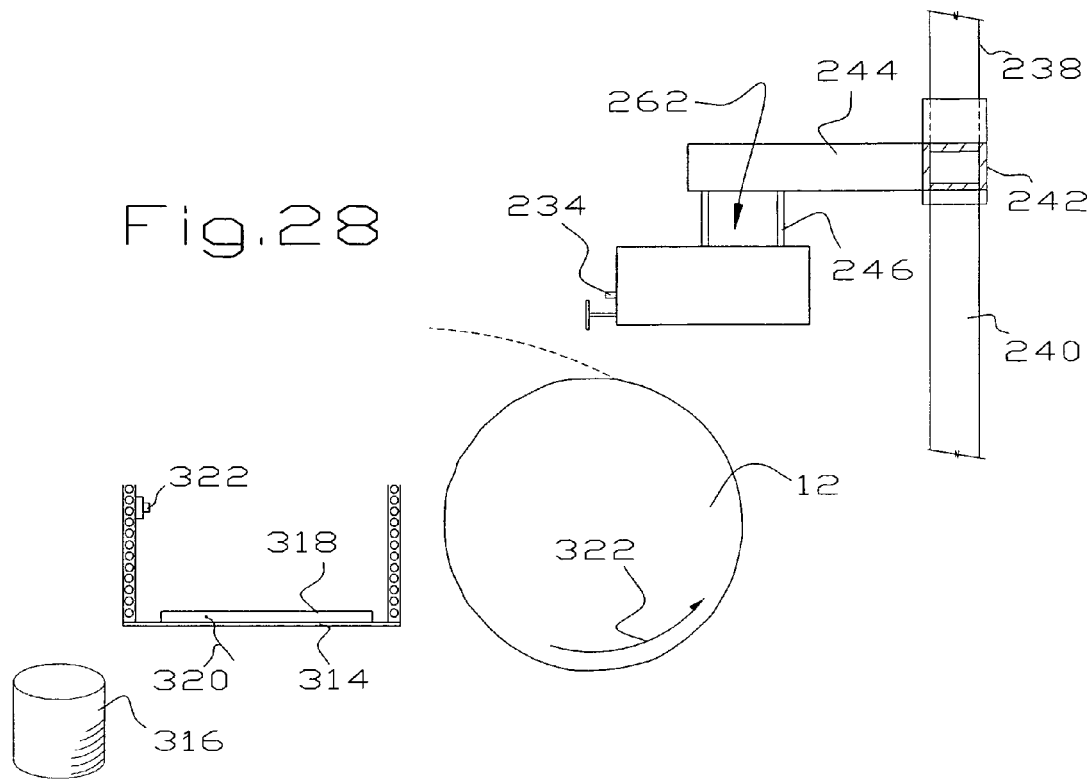
FIG. 28 is a view similar to FIG. 24 showing the use of a platform on which workers stand to pull the plastic wrap off the module.

A great deal of effort has been spent to make a mechanical grabber for pulling the plastic wrap 14 off the module 12 without human assistance. Some of the embodiments work better than others but none of them have worked perfectly for long periods of time. Referring to FIG. 28 an elevated platform 314 is mounted on a side of the gantry 242 where the grabber is located in previous embodiments. A worker or two pulls the plastic wrap 14 off the module 12 after it has been slit. The platform 314 is provided at an elevation where it is convenient for the worker to lean over the upper roller 310 of one of the arms 308 and grasp the cut plastic wrap 14 so that when the module 12 is rotated, the plastic unrolls off the top of the module 12 as shown in FIG. 27. An important feature of this embodiment is the workers do not have to manhandle the modules 12, which weigh in the neighborhood of 5,000 pounds. Because the module 12 is rotated by the rollers 310, the workers simply have to get the slit wrapping 14 started in the right direction and guide it toward a refuse container 316. A weight sensitive mat 318 is preferably installed on the platform 314 and provides a wire 320 connected to the computer 21 to provide an input signifying the presence or absence of a worker on the platform 314. Normally, operation of the device 224 proceeds automatically when no one is present on the mat 318, i.e. under the control of the computer 21. However, when the time in the cycle comes that the plastic wrap 14 has been slit and the module 12 is ready to be rotated to remove the plastic wrap 14, continued computer controlled operation of the device 224 stops unless a worker is present on the platform 318. In other words, when the time comes to remove the plastic wrap 14 by rotating the module 12 in the direction shown by the arrow 322, the device 224 does not proceed unless a signal appears on the wire 320 showing the presence of a worker on the platform 314. In addition, a kill switch 322 is provided on the platform so a worker can manually stop operation of the device 224 in the event a problem occurs.

Figure 29:
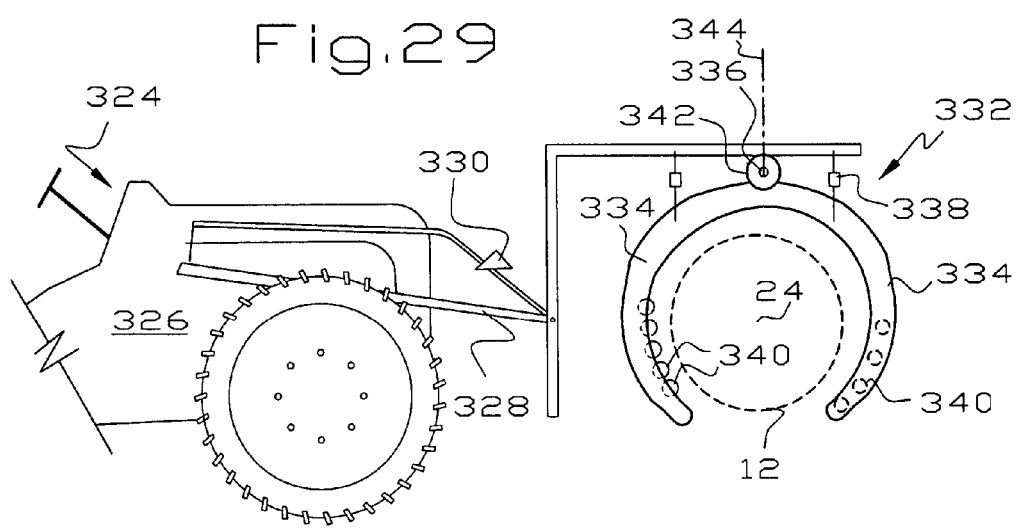
FIG. 29 is a side view of a front end loader equipped with an implement similar to the rotating device of this invention.
Figure 30:
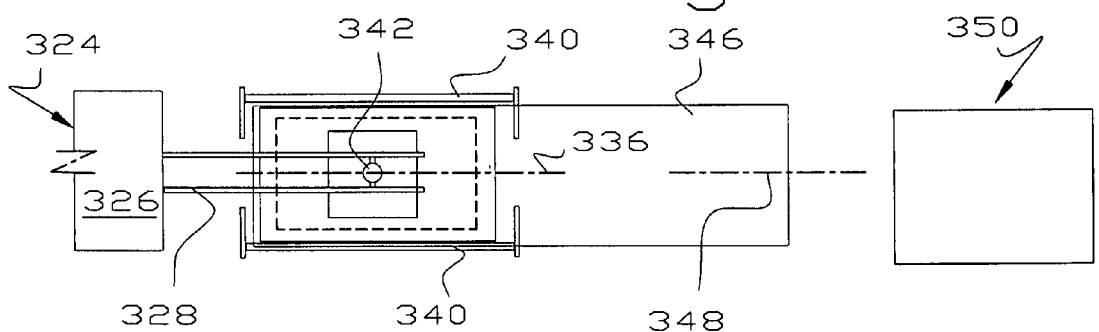
FIG. 30 is a top view of the loader of FIG. 28 approaching a module feeder.

Referring to FIGS. 29 and 30, a tractor or powered vehicle 324 such as a front end loader includes a mobile wheeled powered frame 326 having arms 328 pivoted to the frame 326 controlled by hydraulic cylinders 330. An implement 332 on the arms 328 is much like the arms 308 and powered rollers 310 shown in FIG. 27 so the vehicle 324 can raise, rotate and discharge round modules 12 in much the same manner that the gantry 242 does. The implement 332 accordingly comprises arms 334 pivoted about a horizontal axis 336 under the control of suitable hydraulic cylinders 338 and a series of powered rollers 340 which are synchronized with movement of the arms 334 so the rollers 340 roll but do not slide on the plastic wrap of the module 12. In this manner, the rollers 340 do not tear the plastic wrap and minimize or prevent plastic from entering the gin.

The implement 332 is conveniently mounted on the arms 328 by a swivel 342 for rotation about a vertical axis 344 and the angular position controlled in a suitable manner, as by the provision of a hydraulic cylinder (not shown) or by making the swivel 342 as part of a rotary hydraulic motor capable of limited rotation, e.g. only 90°, so the module 12 can be rotated 90° so the module 12 may be rotated from the position shown in FIG. 29 to the position shown in FIG. 30 thereby allowing the loader 324 to approach a conveyor 346 either parallel to or perpendicular to the axis 348 of the conveyor 346. The conveyor 346 leads to a disperser or hopper 350.

The cover 14 is removed from the module 12 by raising the module 12 off the underlying surface, rotating the module 12 to locate the tag 117 and thereby locate the unadhered tail 22, slitting the cover 14 on the underside of the module 12 and opening the arms 334 to discharge the contents of the module 12 onto the conveyor 346.

FIG. 31 shows another embodiment in which the loader 324 may be used. A cotton gin may be equipped with one or more hoppers 352 of the type shown in FIG. 1, 4 or 5. The loader 324 lifts the module 12 off the underlying surface, transports it to the hopper 352 and, at some location between its stowed position and the hopper 352, slits the plastic wrap 14. Contents of the module 12 are discharged directly into the hopper 352, meaning that no conveyor 346 is required.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A module feeder for digesting round modules wrapped with a cover, comprising a hopper having disperser elements therein for disintegrating fibrous material in the module, a conveyor for delivering the wrapped modules toward the hopper and a mechanism for lifting the modules off the conveyor, rotating the modules and locating an unadhered tail on the cover and then stopping rotating to allow a slitter to cut the cover at a location away from the tail, a slitter movable to a position to cut the cover when rotation has stopped and a control unit for controlling operation of the mechanism and slitter.

2. The module feeder of claim 1 wherein the lifting mechanism comprises a plurality of powered rollers located adjacent a conveying plane of the conveyor and a motor for raising the rollers through the conveying plane in a path to abut and lift the modules off the conveyor and to rotate the modules.

3. The module feeder of claim 1 wherein the lifting mechanism comprises a plurality of powered first rollers located adjacent a conveying plane of the conveyor and a motor for raising the first rollers through the conveying plane in a path to abut and lift the modules off the conveyor and the conveyor is a roller bed conveyor comprising a plurality of powered second rollers rotating about axes perpendicular to a path of movement of the conveyor, the first and second rollers being parallel and interdigitated.

4. The module feeder of claim 1 wherein the mechanism includes a device for removing the cover from the module wherein the removing device includes a subsystem conducting a cover removing operation on the module while it is being rotated.

5. The module feeder of claim 1 further comprising a grabber for grasping the cover following operation of the slitter.

6. The module feeder of claim 1 wherein the hopper is at an end of the conveyor for receiving modules discharged off the end of the conveyor.

7. The module feeder of claim 1 wherein the hopper is on a side of the conveyor adjacent an end thereof for receiving modules discharged off the side of the conveyor and further comprising a pusher for pushing modules off the side of the conveyor into the hopper.

8. A device for removing a protective cover from a round module comprising a frame for raising the round module off an underlying surface and rotating the module, a slitter for cutting the cover along a path including a mechanism for moving the slitter up and down in response to the configuration of the module along the path, the mechanism including a guide wheel for contacting the round module and thereby moving the slitter up and down in response to the configuration of the module.

9. A cotton gin including at least one gin stand for separating lint from seed and a module feeder for digesting round modules wrapped with a cover, comprising a hopper having disperser elements therein for disintegrating fibrous material in the module, a conveyor for delivering the wrapped modules toward the hopper, a device for raising the module off the conveyor, rotating the module and locating an unadhered tail on the cover and then stopping rotation to allow a slitter to cut the cover, then rerotating the module to facilitate removal of the cover, and then replacing the module on the conveyor, a slitter for cutting the cover at a location away from the tail when the module is off the conveyor and a pusher for pushing on a side of the module for pushing contents of the module toward the hopper.

10. The module feeder of claim 1 wherein the mechanism is positioned to drop module contents directly into the hopper.

11. A device for removing a protective cover from a round module thereby preparing the module for a disperser where fibrous material of the module is digested, comprising a device for raising the module off an underlying surface, and then rotating the module to locate an unadhered tail of the cover and then causing the module to come to rest, a slitter for cutting the cover at a location away from the tail after the module comes to rest and a platform for supporting a worker in a position to grab the slit cover and unroll it while the rotating device rerotates the module.

12. The device of claim 11 further comprising a mechanism for detecting the presence of a person on the platform.

* * * * *